Patented June 6, 1933

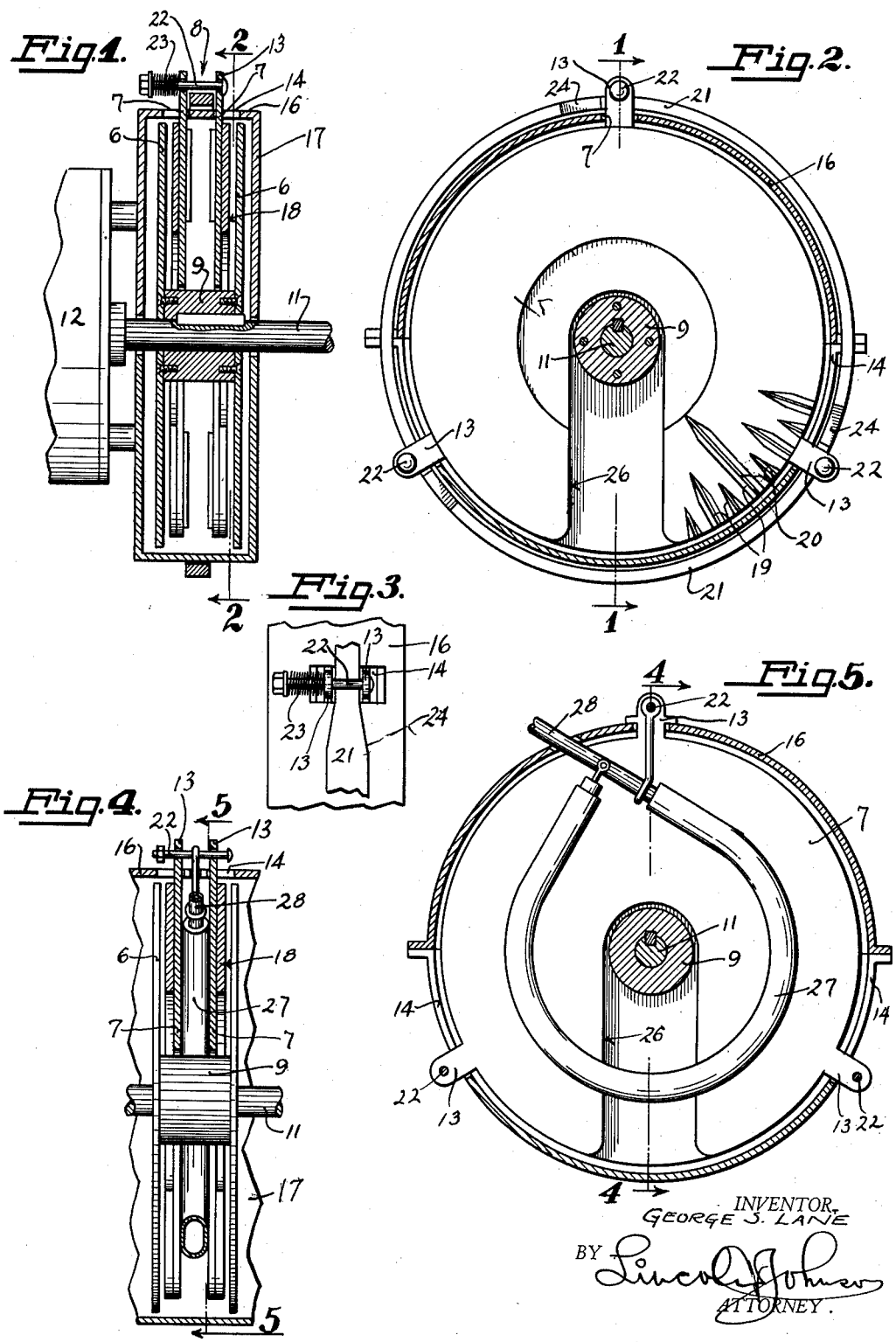

1,912,715

UNITED STATES PATENT OFFICE

GEORGE S. LANE, OF SAN ANSELMO, CALIFORNIA, ASSIGNOR TO WALLACE SHEEHAN, OF SAN FRANCISCO, CALIFORNIA, AS TRUSTEE

CLUTCH OR BRAKE MECHANISM

Application filed November 4, 1929. Serial No. 404,689.

This invention relates to clutch and brake mechanisms.

It is the primary object of the invention to provide a friction mechanism for clutches or brakes, in which a set of non-rotative members are brought into frictional engagement with a set of rotating members so as to retard and resist the rotation thereof; the rotative members being connected to a prime mover or an intermediate driving mechanism.

Particularly it is the object of the invention to provide a rotation resisting mechanism brakes, which may be applied at will, and which effect the retarding action by the simultaneous, frictional engagement of a pair of non-rotative discs with the respective faces of a pair of driven rotative discs, the friction faces of one of the sets of discs being equalized by indentations, depressions, or slots or the like, to reduce the friction surface of the respective discs, at certain circumferential areas, whereby the frictional force is distributed over the disc surfaces, in any desired manner, and whereby the heat developed by reason of the friction is effectively dissipated.

Another object of the invention is to provide a frictional mechanism which may be readily used either as a clutch for transmitting rotation, or as a brake for retarding rotation, the friction mechanism particularly comprising a pair of spaced rotative disks, and a pair of spaced non-rotative discs disposed between the first mentioned discs and being adapted to be moved away from each other, into frictional engagement with the respective inner faces of the rotative discs, the friction faces of either set of the discs being corrected by depressions, or slots, whereby a certain portion of the surface is eliminated, and friction is distributed over the surface in the desired manner.

Other objects and advantages are to provide a clutch or brake mechanism that will be superior in point of simplicity, inexpensiveness of construction, positiveness of operation, and facility and convenience in use and general efficiency.

In this specification and the annexed drawing, the invention is illustrated in the form considered to be the best, but it is to be undertsood that the invention is not limited to such form, because it may be embodied in other forms; and it is also to be understood that in and by the claims following the description, it is desired to cover the invention in whatsoever form it may be embodied.

In the accompanying one sheet of drawing:

Fig. 1 is a vertical section of the clutch or brake mechanism, the section being taken on the line 1—1 of Fig. 2.

Fig. 2 is a sectional front view of the mechanism, the section being taken on the line 2—2 of Fig. 1.

Fig. 3 is a fragmental view of the device, showing the arrangement of the cam ring thereon.

Fig. 4 is a sectional view of a modified form of the mechanism, the section being taken on the line 4—4 of Fig. 5.

Fig. 5 is a sectional view of the modified embodiment, the section being taken on the line 5—5 of Fig. 4.

In its general organization, my invention comprises a pair of spaced rotary discs 6, and a pair of non-rotative discs 7 adapted to engage the inner faces of the discs 6. An actuating mechanism, denoted in its entirety by the numeral 8, is provided to move the discs 7 away from and toward each other respectively, into and out of frictional engagement with the discs 6.

The rotary discs 6 are mounted on a sleeve or spool 9, which in turn is keyed on a rotating shaft 11. The shaft 11 may be any rotary element of a driving or driven mechanism. In the present illustration the invention is shown as a brake mechanism on the power shaft of a transmission 12.

Each non-rotative disc 7 has three lugs 13 extending from the periphery thereof, which extend thru apertures 14 of the peripheral wall 16 of a housing 17. The housing 17 in turn is fixedly supported on the transmission 12. Each aperture 14 is of such a width as to accommodate the respective lugs 13, but to prevent the rotary movement of said lugs 13 and of the respective discs 7. The apertures 14 are axially elongated, whereby the discs 7 are permitted to move axially, but are held against rotation. The apertures 14 are also so arranged that the ends thereof nearer the center plane of the housing 17, limit the movement of the discs 7 toward each other, thereby spacing the same in their inoperative position.

The outer face of each disc 7 has a friction face 18 thereon which is corrugated by means of radial indentations 19, the latter having slots 20 at the bottom thereof, whereby the area of the friction surfaces is corrected to the desired friction distribution. The slots 20 also assist in the dissipation of heat from the friction surfaces.

Normally when the discs 7 are in inoperative position, they are spaced from each other by the inner ends of the apertures 14. In order to bring the discs 7 into frictional engagement with the respective discs 6, it is necessary to move the discs 7 apart, away from each other. The discs 7 are actuated by a cam ring 21, which is rotatably disposed around the peripheral wall 16 of the housing 17, between the lugs 13. The lugs 13 of the opposite discs 7 are in registry with each other and each registering pair of lugs has a pin 22 slidably extending therethru. Around the pin 22 is a coil spring 23 disposed between the head of the pin and the outer face of the respective lug 13, so as to urge the discs 7 toward each other. The ring 21 is of varying width, namely, at certain points corresponding to each pair of lugs, it is increased in width as at 24, so that when the ring 21 is turned, the portion 24 thereof is wedged between the discs 6, and moves the same away from each other, axially, and toward the rotating discs 6. In this manner the discs 7 are simultaneously brought into frictional contact with the respective discs 6, and the frictional force is thus applied. The spring 23 returns the discs 7 into inoperative position, after released by the cam portion 22.

The housing 17 is made in two semi-circular half sections detachably secured to each other. Each non-rotative disc 7 has a radial channel 26 cut thereinto, corresponding to the width of the spool 9, so as to permit the removal of said discs 7, when a half of the housing 17 is moved in an out of way position.

A modified embodiment of the disc actuating mechanism is shown in Figs. 4 and 5. This actuating mechanism comprises an expansible tube 27 disposed within the housing 17, between the discs 7 and suspended from one pair of lugs. An end 28 of this tube protrudes outside of the housing 17 for connection with a supply of hydraulic pressure. The tube 27 is arranged in a ring form for simultaneous engagement with the discs 7, all around its periphery. By introducing air or fluid pressure or the like, into the tube 27, the same is inflated and expands, thereby urging the discs 7 apart from each other and into frictional contact with the discs 6. When the tube is deflated the discs 7 move away from the discs 6, due to the centrifugal and frictional forces created thereat.

It will be recognized that in all embodiments of my invention the discs are positively engaged with each other, at will; they exert equal pressures in opposite directions; the mechanism combines simplicity and positiveness of operation with ruggedness of construction; it does not require any careful adjustment, or take up readjustment, and it readily lends itself to effective application for the purposes set forth.

Having thus described this invention, what I claim and desire to secure by Letters Patent is:

1. In a device of the character described a set of spaced rotary members, a set of non-rotating members disposed between the rotary members, a cam ring between the outer peripheries of the non-rotating members, and means on said peripheries to coact with the cams of the ring as the latter is turned to move said non-rotating members into engagement with the rotating members to resist the rotation thereof.

2. In a device of the character described a set of spaced rotary members, a set of non-rotating members disposed between the rotary members, a cam ring between the outer peripheries of the non-rotating members, and means on said peripheries to coact with the cams of the ring as the latter is turned to simultaneously move said non-rotating members into frictional engagement with the rotating members to resist the rotation thereof.

3. In a device of the character described, a stationary housing, a rotary element extending therethru, a pair of fixedly spaced discs in the housing, mounted on the rotary element to rotate therewith; a pair of spaced discs disposed between said rotary discs, and being held against rotative movement with freedom of axial movement away from each other to engage said rotating discs, and aligned radial extensions on the opposed non-rotative discs, a rotary cam ring disposed between the extensions with the cam portions of the ring equally spaced from their respective extensions to simultaneously move said non-rotative discs into frictional engagement with the rotated discs when the ring is turned.

4. In a device of the character described a stationary housing, a rotary element extending therethru, a pair of fixedly spaced discs in the housing, mounted on the rotary element to rotate therewith; a pair of spaced discs disposed between said rotary discs, and being held against rotative movement with freedom of axial movement away from each other to engage said rotating discs, aligned radial extensions on the non-rotating discs and means engaging said extensions to move said non-rotative discs into and out of frictional engagement with said rotary discs, said disc moving means comprising an annular cam ring between the said extensions having enlarged cam portions equally spaced from the extensions to exert an outward force on the adjacent faces of the said extensions when the ring is actuated to move said cam portions into the space between the extensions.

5. In a device of the character described a stationary housing, a rotary element extending therethru, a pair of fixedly spaced discs in the housing, mounted on the rotary element to rotate therewith; a pair of spaced discs disposed between said rotary discs, and being held against rotative movement with freedom of axial movement away from each other to engage rotating discs; aligned radial extensions on the non-rotative discs; a rotatable annular cam ring between the extensions of the non-rotative discs, rotatable between said extensions to exert an outward force on the adjacent faces of the said extensions and move the non-rotative discs outwardly into engagement with the rotary discs; and resilient means of connection between the extensions to return said non-rotative discs to inoperative position after the cam portion of the ring is withdrawn from between the extensions.

In testimony whereof, I have hereunto set my hand at San Francisco, California, this 22d day of October 1929.

GEORGE S. LANE.